US008087507B2

(12) United States Patent
Geiger et al.

(10) Patent No.: US 8,087,507 B2
(45) Date of Patent: Jan. 3, 2012

(54) RELEASE BEARING ASSEMBLY

(75) Inventors: Dean Alan Geiger, Churubusco, IN (US); Troy Scott Reinoehl, Golden, CO (US); Robb Edward Grostefon, Fort Wayne, IN (US); Arif Husain Mirza, Fort Wayne, IN (US); Brent Allen Savage, Hicksville, IN (US); Daniel Vern Gochenour, Auburn, IN (US); Steven Eric McCutcheon, Fort Wayne, CO (US); James L. Whitaker, Hicksville, IN (US)

(73) Assignee: Eaton Corporation, Cleveland, OH (US)

( * ) Notice: Subject to any disclaimer, the term of this patent is extended or adjusted under 35 U.S.C. 154(b) by 611 days.

(21) Appl. No.: 12/323,891

(22) Filed: Nov. 26, 2008

(65) Prior Publication Data

US 2009/0071790 A1  Mar. 19, 2009

Related U.S. Application Data

(63) Continuation-in-part of application No. 11/708,249, filed on Feb. 20, 2007, now Pat. No. 7,712,595.

(60) Provisional application No. 61/024,633, filed on Jan. 30, 2008.

(51) Int. Cl.
*F16D 23/14* (2006.01)
*F16D 13/74* (2006.01)
(52) U.S. Cl. .................. 192/98; 192/110 B; 192/113.5; 384/606
(58) Field of Classification Search ................ 192/113.5; 384/606
See application file for complete search history.

(56) References Cited

U.S. PATENT DOCUMENTS

| 2,005,464 | A | * | 6/1935 | Hermann | 384/606 |
| 3,604,545 | A | * | 9/1971 | Bourgeois | 192/98 |
| 7,712,595 | B2 | * | 5/2010 | McCutcheon et al. | 192/98 |

OTHER PUBLICATIONS

Figure 1: System Nomenclature. Figure 1 is a general depiction of a clutch system and provides a description of the nomenclature used throughout this description.
Figure 2: Standard Eaton greaseable bearing assembly (front). Shows a common release bearing assembly used with clutches. This particularly shows the Eaton assembly, but other greaseable bearing designs mimic the same features and functions.
Figure 3: Standard Eaton greaseable bearing assembly (bottom). Shows a common release bearing assembly used with clutches. This particularly shows the Eaton assembly, but other greaseable bearing designs mimic the same features and functions.
Figure 4: View showing the inside of the standard Eaton greaseable bearing assembly (cover not shown). Provides nomenclature for the components of the release assembly.
Figure 5: Cross section of the Eaton greaseable bearing assembly. Shows the cross section of Figure 4.
Figure 6: Enlarged view of Eaton greaseable bearing assembly cross section showing grease flow. Demonstrates some of the inefficiencies of the current release bearing designs.
Figure 7: Eaton sealed bearing assembly. Shows a standard bearing assembly using a sealed bearing design. The sealed bearing helps address the issue of bearing contamination.

* cited by examiner

*Primary Examiner* — Rodney Bonck
(74) *Attorney, Agent, or Firm* — Kevin M. Hinman

(57) ABSTRACT

A release bearing assembly has a roller bearing, an enclosure and a slinger. The enclosure has first and second flange portions. The slinger has a body portion sized for radial disposition within an inner diameter of the first flange portion. A lip portion extends from the body portion and defines a channel between itself and the enclosure.

8 Claims, 6 Drawing Sheets

US 8,087,507 B2

RELEASE BEARING ASSEMBLY

RELATED APPLICATIONS

This continuation in part application claims the benefit of U.S. patent application Ser. No. 11/708,249, filed Feb. 20, 2007 and U.S. Provisional Application 61/024,633, filed on Jan. 30, 2008, the disclosures of which are incorporated herein by reference.

FIELD OF THE INVENTION

The present invention relates to improvements in clutch systems and clutch release bearing assemblies. More particularly, this invention relates to sealing systems for release bearings.

BACKGROUND OF THE INVENTION

It is desired to provide a release bearing assembly with an improved means which is resistant to wear and effective at both keeping debris out of a cavity in which a roller bearing is disposed and retaining grease within the cavity.

SUMMARY OF THE INVENTION

The claimed release bearing assembly provides an improved means which is resistant to wear and effective at both keeping debris out of a cavity in which a roller bearing is disposed and retaining grease within the cavity.

Such a release bearing assembly has a roller bearing, an enclosure and a slinger. The enclosure has first and second flange portions. The slinger has a body portion sized for radial disposition within an inner diameter of the first flange portion. A lip portion extends from the body portion and defines a channel between itself and the enclosure.

DETAILED DESCRIPTION OF A PREFERRED EMBODIMENT

Figure 1:
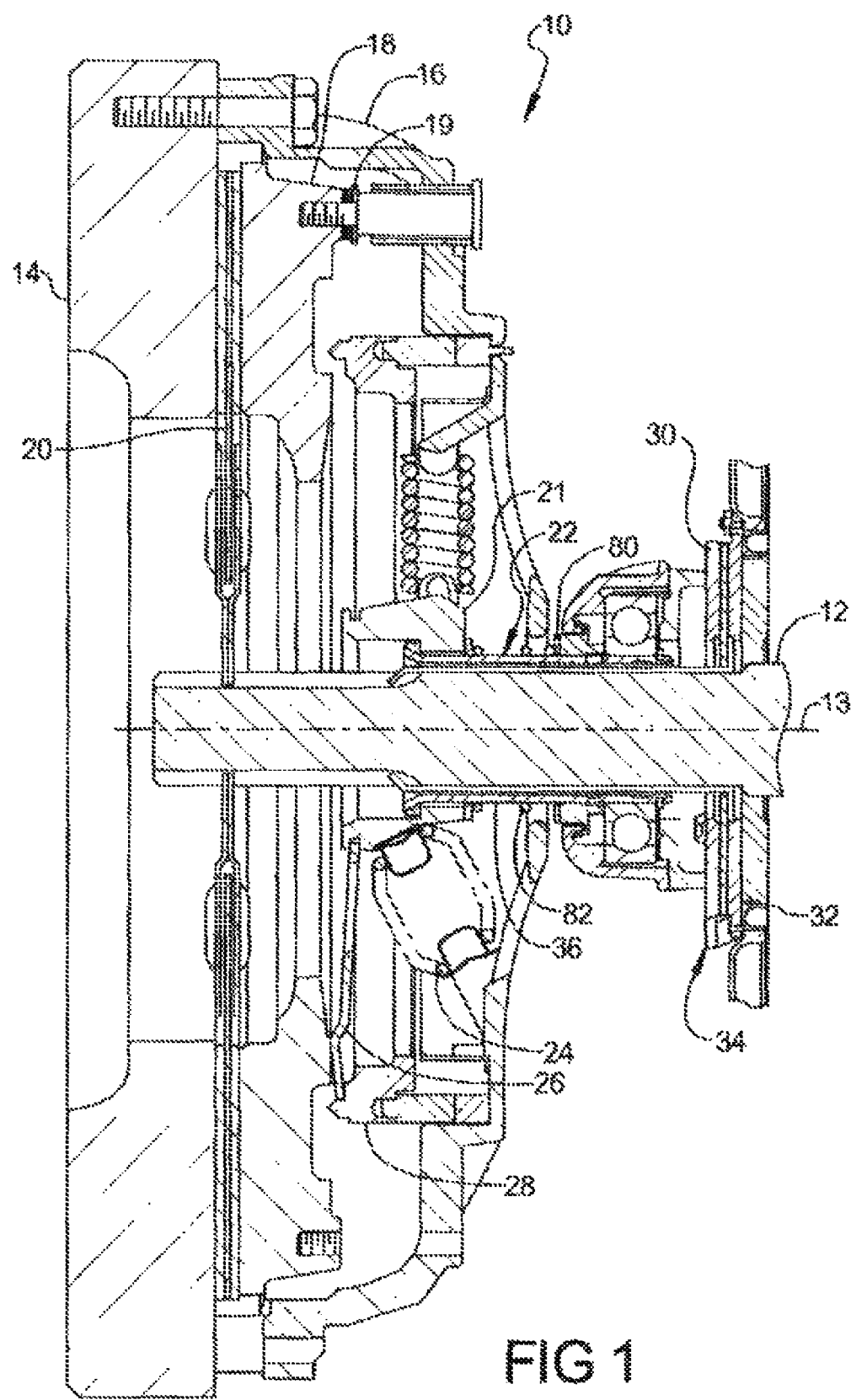
FIG. 1 is a sectional side view of a clutch employing a first embodiment of the inventive release bearing assembly.

An exemplary motor vehicle clutch assembly 10 is shown in FIG. 1. Clutch assembly 10 is, when installed in a vehicle, disposed between a transmission input shaft 12 and an engine crank shaft (not shown). Clutch assembly 10 has an axis of rotation 13 about which clutch assembly 10 and input shaft 12 rotate. A flywheel 14 is configured to be rigidly fixed to the engine crank shaft. A cover 16 is rigidly mounted to flywheel 14. A pressure plate 18 is rotatably fixed to cover 16 by means, such as one or more flexible straps 19, which allow pressure plate 18 to move axially relative to cover 16. A driven disc 20 is axially disposed between pressure plate 18 and flywheel 14.

A retainer 21 of a retainer and release bearing assembly 22 is engaged by a plurality of apply springs 24 and levers 26. Levers 26 pivotably contact an adjusting mechanism 28 and engage pressure plate 18. Apply springs 24 bias levers 26 against pressure plate 18.

A clutch brake 30 is disposed between a feature fixed to or integral with a transmission housing 32 and a clutch release bearing and housing assembly 34. Clutch brake 30 has a disc member rotatably coupled to input shaft 12. When a release bearing assembly 34 of assembly 22 is moved against clutch brake 30, the speed of input shaft 12 is gradually halted due to the compressive frictional contact between the disc and the engaging surfaces of brake 30.

Release bearing assembly 34 is connected to retainer 21 by a retainer sleeve 36. A snap ring 37 keeps release bearing assembly 34 on sleeve 36.

Figure 2:
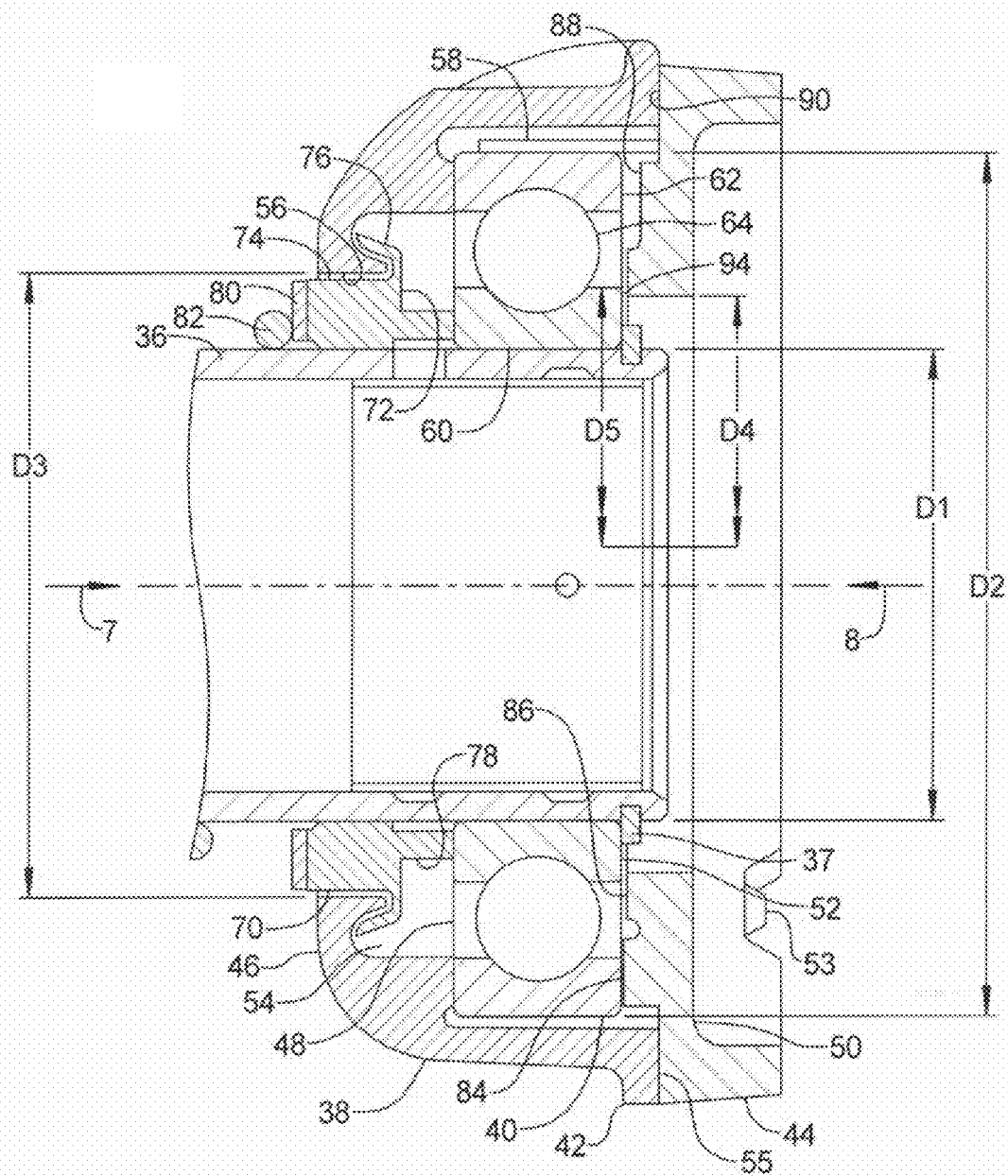
FIG. 2 is a sectional view of the release bearing assembly of FIG. 1.
Figure 3:
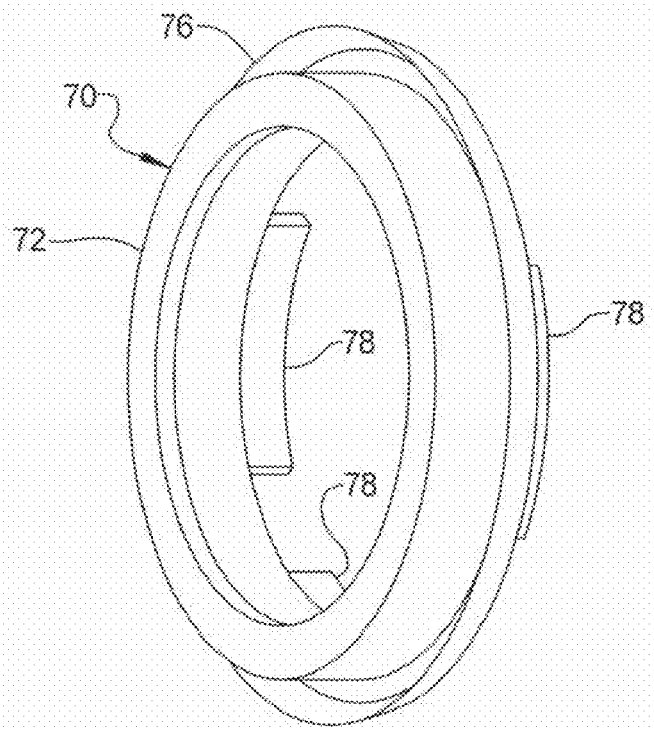
FIG. 3 is a first perspective view of a slinger of the release bearing assembly of FIG. 2.
Figure 4:
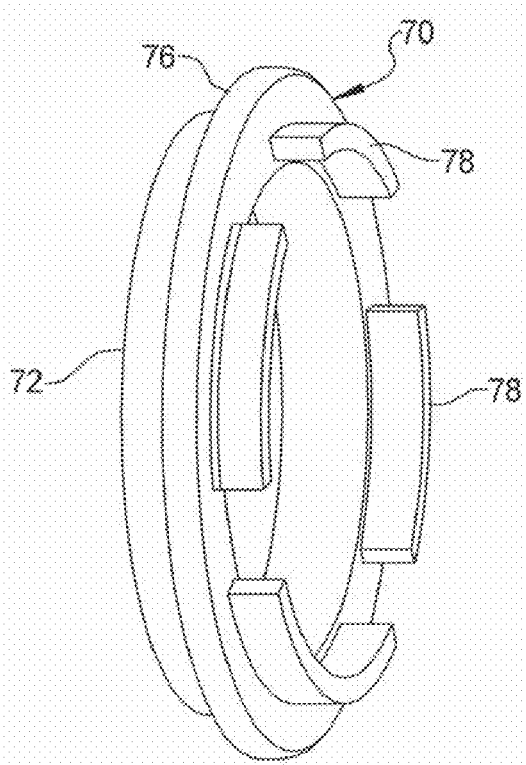
FIG. 4 is a second perspective view of the slinger of FIG. 4.

Release bearing assembly 34, best shown in FIG. 2, includes both a bearing enclosure 38 and a roller bearing 40 disposed therein. Enclosure 38 includes a first part, or a bearing housing 42, and a second part, or a backer plate 44. Housing 42 has a first flange portion 46 extending radially inwardly over a first end 48 of bearing 40. Backer plate 44 has a second flange portion 50 extending radially inwardly over a second end 52 of bearing 40. Housing 42 and backer plate 44 together defines a cavity 54 retaining bearing 40 therein. Housing 42 and backer plate 44 are joined by rivets 53 or other appropriate fastening means to form a sealed seam 55 therebetween. First flange portion 46 has an axially extending inner diameter edge 56. The length of the axial edge can be fairly short, in some cases no longer than the thickness of the housing. A leaf spring 58 is radially disposed between housing 42 and bearing 40, biasing bearing 40 against radially extending portions (not shown) of housing 42 within cavity 54 in a manner well known in the art and described in U.S. Pat. No. 5,947,251.

Figure 7:
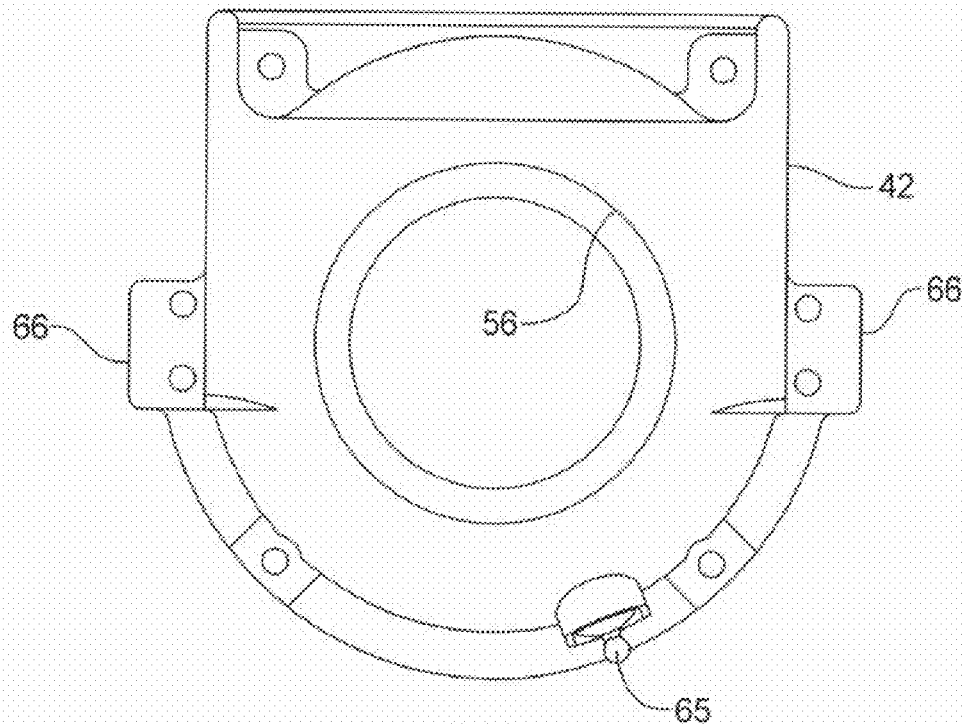
FIG. 7 is a view of the release bearing assembly of FIG. 2 in the direction of arrow 7.
Figure 8:
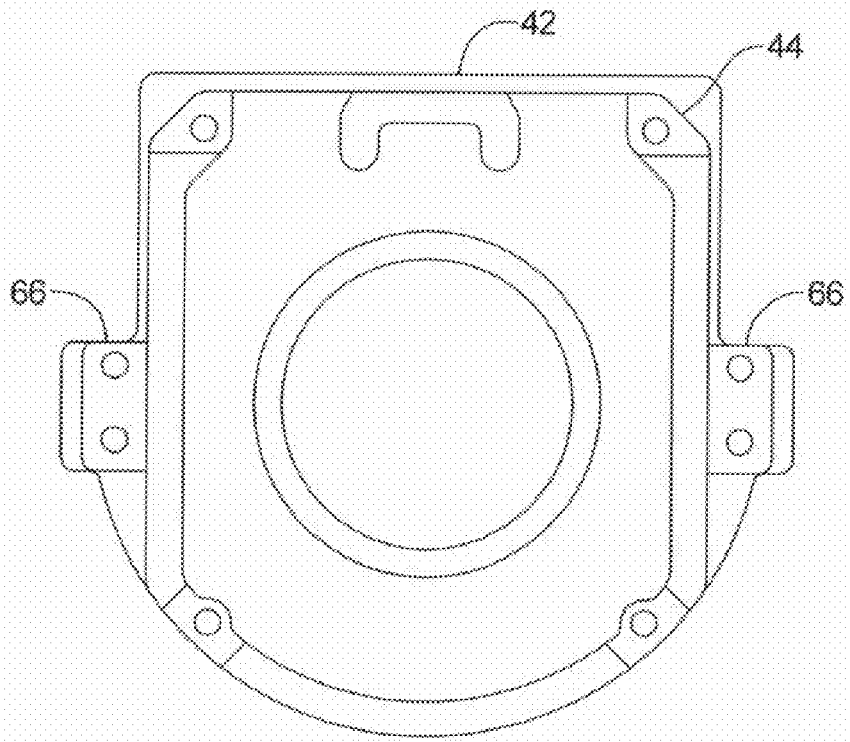
FIG. 8 is a view of the release bearing assembly of FIG. 2 in the direction of arrow 8.

Roller bearing 40 as shown in FIG. 2 includes an inner race 60, an outer race 62, rollers 64 and a cage (not shown) which helps retain rollers 64. An inner diameter D1 of inner race 60 is sized to receive retainer sleeve 36. The size of diameter D1 may provide a press-fit relationship with sleeve 36. A grease fitting 65, shown in FIG. 7, may be threaded into a side of bearing housing 42 through an aperture therein. Housing 42 may also have a pair of engagement ears 66, as shown in FIGS. 7 and 8, upon which may be mounted replaceable wear elements for engagement with a clutch fork (not shown).

Inner diameter edge 56 has a diameter D3 which is larger than the inside diameter D1 and smaller than an outside diameter D2 of outer race 62. Flange portion 46 is therefore able to retain roller bearing 40 while allowing sleeve 36 to enter cavity 54.

A slinger 70 is disposed between sleeve 36 and housing 42. Slinger 70 has a body portion 72 sealingly disposed over sleeve 36 for rotation therewith and defines a channel or labyrinth 74 relative to edge 56 of housing 42. Body portion 72 has its inside diameter sized to forms a seal between body portion 72 and sleeve 36. Slinger 70 has a radially outwardly extending lip portion 76 extending from body portion 72 along housing 42 and defining a radial extension of channel 74.

In the illustrated embodiment, lip portion 76 extends along an interior surface of housing 42. This beneficially enables slinger to sling or move any grease on it inside cavity 54 radially outwardly toward rollers 64. In an alternative embodiment lip portion 76 could extend along an exterior surface of housing 42, outside of release bearing assembly. Such an arrangement is described in the below description of FIG. 10. It is desirable with any embodiment that lip portion-to-housing contact be minimal or non-existent so as to minimize wear between the parts.

A plurality of fingers 78 extend axially from body portion 72 toward bearing inner race 60. A thrust plate or washer 80 is disposed over an end of slinger 70 opposite fingers. Thrust plate 80 is axially biased against slinger 72, with fingers 78 in turn being pressed against inner race 60 by a retainer spring 82. Spring 82 is disposed between plate 80 another thrust plate that rest against retainer 21. Plate 80 helps to distribute the load from spring 82 evenly against slinger 72. If slinger 70 is formed of elastomeric material, plate 80 protects slinger 72 from localized deformation by spring 82. If slinger 70 is formed from steel, or other essentially non-compliant material, plate 80 may not be required.

Figure 5:
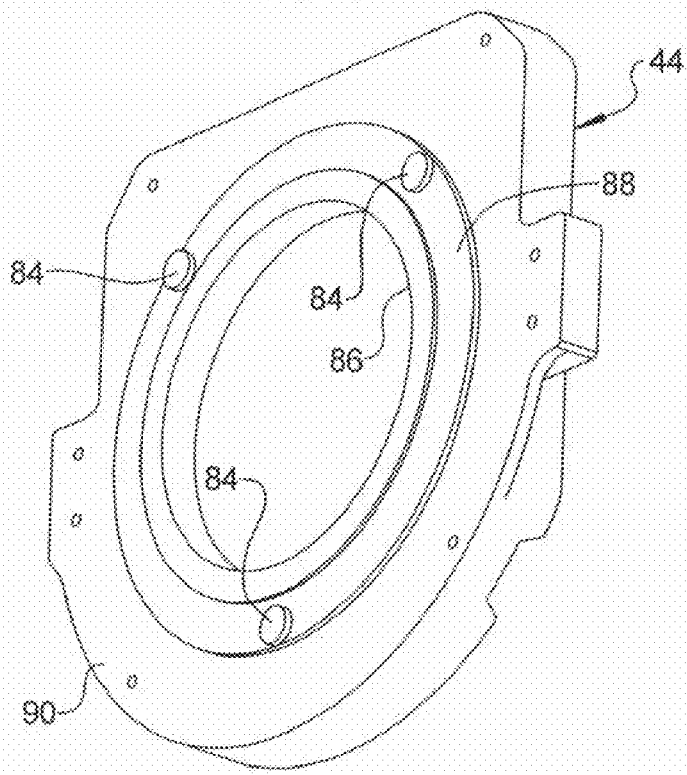
FIG. 5 is a first perspective view of a backer plate of the release bearing assembly of FIG. 2.
Figure 6:
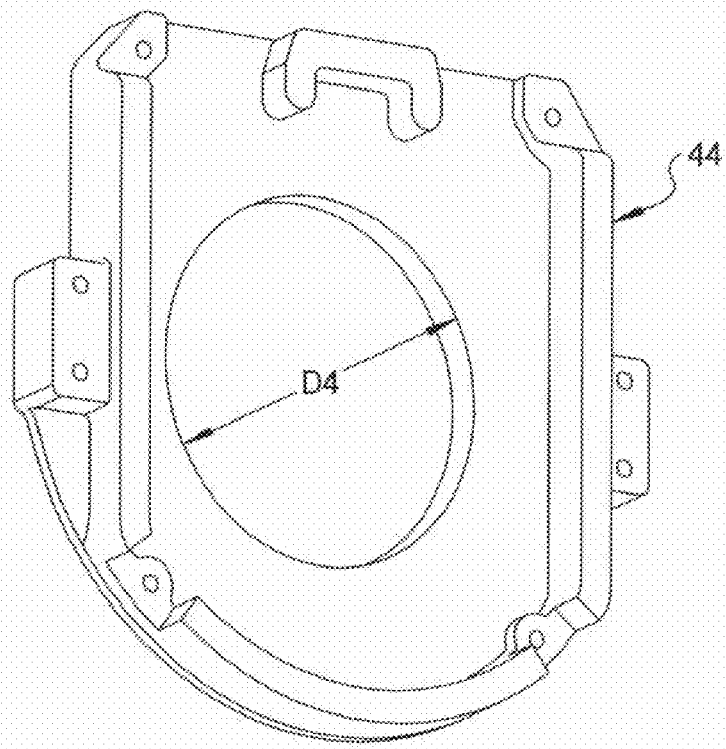
FIG. 6 is a second perspective view of the backer plate of FIG. 5.

A side of backer plate 44 facing housing 42 as shown in FIG. 2 and FIG. 5 has a plurality of bearing stops 84 for engagement with outer race 62. Stops 84 extend axially further toward bearing 40 than an integral backer plate shield 86. Both stops 84 and shield 86 extend from an as-cast surface 88 of backer plate 44. The function of stops 84 is to ensure a minimum axial spacing of the non-rotating shield 86 from the spinning inner race 60 when a sealing surface 90 of backer plate 44 is fixed to housing 42. Together shield 86 and race 60 define a rear or second channel restricting the entry of debris into cavity 54 and bearing 40. An inside diameter D4 of backer plate 44 and shield 86 is smaller than an outside diameter D5 of inner race 60. The radial overlap of shield 86 and inner race 60 define rear channel 94. Channel 94 could also be defined without the radial overlap of inner race 60 and shield 86 if the distance between inner race 60 and shield 86, that is the width of channel 94, is sufficiently small.

Figure 9:
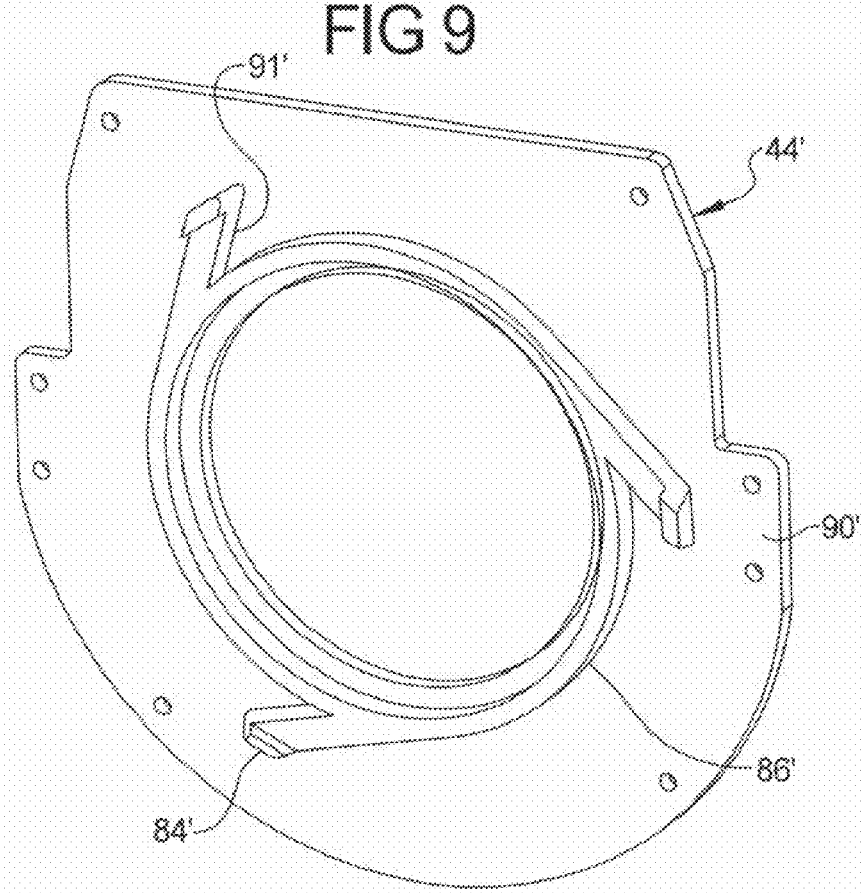
FIG. 9 is a perspective view of an alternative embodiment of the backer plate of FIGS. 5 and 6.

An alternative embodiment for the shield on backer plate is shown in FIG. 9. Backer plate 44' has backer plate bearing stops 84' and a backer plate shield 86' disposed thereon. Stops 84' and shield 86' may be formed integral with backer plate 44', or may be formed separately from backer plate 44' from a different material. For example, backer plate 44 could be formed of steel, and stops and shield formed of elastomeric material. Fins 91' connect stops 84' and shield 86'. Fins 91' can help distribute grease within bearing 40 and enclosure 38.

Figure 10:
FIG. 10 is a sectional side view of an alternative embodiment of a slinger.

An alternative embodiment for the rotating slinger is shown in FIG. 10. Slinger 70' is formed of sheet metal, preferably steel. It has an axially extending cylindrical body portion 72', a radially inwardly extending seat portion 78' and a radially outwardly extending lip portion 76'. Seat portion 78' serves as a seat for an end of retainer spring 82. Spring 82 pushes seat portion 78' into engagement with inner race 60. Lip portion 76' overlaps an exterior or outer surface of housing 42. Lip portion 76' and body portion 72' together define a channel restricting the entry of debris into cavity 42 and the exit of grease from cavity 42.

Many modifications and variations of the present invention are possible in light of the above teaching. For instance, the number and width of fingers 78 is not critical to the invention and may vary, as may the number and shape and size of stops 84. It is therefore to be understood, that within the scope of the appended claims, the invention may be practiced other than as specifically described above.

We claim:

1. A release bearing assembly for releasing a motor vehicle clutch and defining an axis of rotation and comprising:
   a roller bearing with an inner race, an outer race and a plurality of rollers disposed between the races and the inner race and the outer race being radially spaced from each other;
   an enclosure enclosing the roller bearing and defining a cavity retaining the bearing and enclosing at least an outer diameter of the outer race of the bearing and engaging the outer race whereby the outer race tends to resist rotation relative to the housing;
   the enclosure having a radially inwardly extending first flange portion disposed over a first end of the bearing and a radially inwardly extending second flange portion disposed over a second end of the bearing and the first flange portion having an axially extending inner diameter edge;
   a slinger having a body portion sized for radial disposition within an inner diameter of the inner diameter edge and the slinger defining a first channel relative to the inner diameter edge and having a radially outwardly extending lip portion extending from the body portion along the housing defining an outward radial extension of the channel between the housing and the slinger and the slinger engaging the inner race for rotation therewith.

2. A release bearing as claimed in claim 1 further comprising:
   an axially extending shield portion extending into the cavity from an inner surface of the second flange portion and the shield portion defining a second channel between the inner race and itself, a minimum distance between the inner race and the shield being defined at least in part by a plurality of bearing stops axially extending from the second flange portion toward the outer race and located radially outwardly of the shield portion whereby radially outwardly movement of debris into the cavity of a predetermined size is restricted by a size of the second channel.

3. A release bearing as claimed in claim 2, further comprising a fin connecting at least one of the bearing stops with the shield portion.

4. A release bearing as claimed in claim 1, further comprising the inner diameter edge extending axially into the cavity and the lip portion radially extending inside of the cavity past the inner diameter edge and following an inner wall of the enclosure.

5. A release bearing as claimed in claim 4 further comprising a plurality of fingers axially extending from the body portion toward and engaging the inner race.

6. A release bearing as claimed in claim 1, further comprising a plurality of fingers axially extending from the body portion toward the inner race for engagement therewith.

7. A release bearing as claimed in claim 1, wherein the lip portion extends radially along an outer side of the first flange portion.

8. A release bearing as claimed in claim 7, further comprising a seat portion extending from the body portion is disposed proximate to the inner race for engagement therewith.

* * * * *